May 28, 1963 H. STATZ 3,091,703

SEMICONDUCTOR DEVICES UTILIZING CARRIER INJECTION INTO A SPACE CHARGE REGION

Filed April 8, 1959

INVENTOR
HERMANN STATZ
BY H. Vincent Harsha
ATTORNEY

United States Patent Office 3,091,703

Patented May 28, 1963

3,091,703
SEMICONDUCTOR DEVICES UTILIZING CARRIER INJECTION INTO A SPACE CHARGE REGION

Hermann Statz, Wayland, Mass., assignor to Raytheon Company, a corporation of Delaware Filed Apr. 8, 1959, Ser. No. 804,913
10 Claims. (Cl. 307—88.5)

This invention relates generally to electrical signal translation devices, and more particularly to devices of this type which comprise a body of semiconductive material containing an impurity material or materials which alter the electrical conductivity characteristics of the seminconductive body.

Recent years have witnessed the discovery and development of a new type of electrical translation device comprising a body of semiconductive material, such as germanium or silicon, which is provided with adjacent zones or regions having different electrical conductivity characteristics. Each of the adjacent zones contains traces of impurity material from either the third or fifth groups of the periodic table according to Mendelyeev, which material gives rise to what is known as P-type conduction, as in the case of the inclusion of an impurity material from the third group, or N-type conduction, to the instance of the inclusion of an impurity material selected from the fifth group. A zone is thus designated as a P or an N zone, depending upon the predominance of the impurity material contained therein, and the interface between two opposite type zones is designated as a P-N (N-P) junction.

Devices of this type in which a single zone of one conductivity-type material, as, for example, N-type, is positioned intermediate two zones of opposite conductivity-type material, such as P-type, are known in the art as P-N-P transistors. Conversely, devices in which the intermediate zone is P-type material and in which the two outer zones are N-type material, have been designated as N-P-N transistors. The two outer zones are, respectively, provided with conducting electrodes designated as emitter and collector, while the intermediate zone has an electrode designated as the base electrode in contact therewith. These devices, when provided with proper biasing voltages, are capable of performing amplifying, rectifying, and in some cases, oscillating functions, and have already found their place in audio frequency and relatively low radio frequency circuit applications. Substantially all these prior art devices depend for their operation upon the random diffusion motion of current carriers across the intermediate base region. However, since the time necessary for these current carriers to complete their transition across the base zone from emitter to collector is relatively long when compared to the frequency at which it is often desirable to provide operation, their use has been seriously restricted at the higher frequencies due, primarily, to the poor frequency response attainable in this region of the electromagnetic spectrum.

In order to overcome these deficiencies, a new type of semiconductive device has been proposed, which differs markedly in structure from those of the prior art, and in which it is possible to obtain adequate frequency response characteristics even at frequencies ranging into the microwave region of the electromagnetic spectrum. Briefly, this device comprises a body of semiconductive material hava a P-N junction, and a plurality of contacts to the body of semiconductive material which are positioned so as to be encompassed by, and included within, a space charge region which may be caused to exist in the vicinity of the P-N junction. The first of these contacts functions as means for injecting current carriers directly into the space charge region established in the body of the semiconductive material whereby the transit time of these carriers on their way to the collector is materially shortened as compared to the transit time of carriers through the base region of prior art transistors. The decreased transit time results from the accelerating force imparted to the current carriers by the strong electric field existing in the space charge region. A second of the above-mentioned contacts also lies within the confines of said space charge region, and functions to vary or modulate the emission of the current carriers by the emitting contact whereby the flow of said current carriers may be controlled by an externally applied signal voltage. In addition, the second or modulating contact functions to effectively reduce the influence of voltage changes across a load connected in the output circuit of the device on the emission of current carriers by the injecting contact leading to a device exhibiting a high output impedance. Thus, the device of the present invention is not restricted in practical application by feedback terms existing between output and input, as occurs in presently known transistors. The spacistor may be used, for example, as an amplifier as shown on page 241 of the March 1959 issue of the Department of the Army Technical Manual TM 11-690 entitled "Basic Theory and Application of Transistors," available from the Government Printing Office.

Devices of the class described have been generally designated as "spacistors," a more complete description thereof being set forth in the prior copending application of Hermann Statz and Robert A. Pucel, Serial No. 672,046, filed July 15, 1957, now abandoned, and assigned to the same assignee as the present application.

The present invention is directed toward certain improvements in the structure set forth in said prior copending application, which improvements involve new geometrical structures for the various electrodes attached to the semiconductor body, in which a substantially radial field is caused to exist in the space charge region in order to more accurately and efficiently control the flow of the current carriers injected by the emitter or injecting electrode. Briefly, this desirable result is accomplished by providing a radial P-N junction, which functions as the collecting junction, and about which is established a substantially symmetrical and radially-disposed space charge region whereby the current carriers injected by the emitter are forced to flow very close to the region of influence of the modulating contact.

The invention will be better understood as the following description proceeds taken in conjunction with the accompanying drawings wherein.

Figure 1:
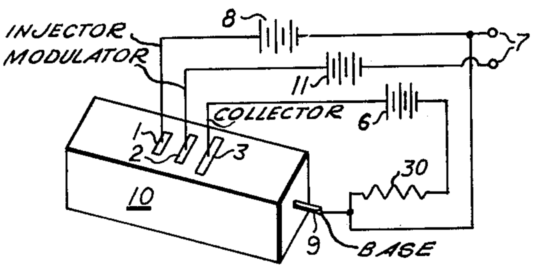
FIG. 1 is a perspective view of one embodiment of a semi-conductive spacistor in accordance with the present invention showing the biasing arrangements.

Referring now to the drawings and more particularly to FIG. 1 thereof, there is shown a schematic representation of a spacistor semiconductive structure embodying one form of the present inventive concept. Numeral 10 designates a body of semiconducting material, which is provided with contacting electrodes 1, 2 and 3. The semiconductive body 10 is, preferably, composed of germanium or silicon. However, the principles of the present invention are not limited to the use of germanium or silicon, but are intended to include any materials of the class known as semiconductors, which may have their electrical conductivity characteristics altered by the inclusion of a conductivity-type determining impurity element therein. In addition to germanium and silicon, other semiconductors include silicon carbide and the so-called intermetallic compounds formed from the metallic elements of groups III and V of the periodic table according to Mendelyeev. For example, these may include indium antimonide, indium phosphide, indium arsenide, gallium antimonide, etc. It should be noted that, since the above-mentioned intermetallic compounds are composed of materials which separately are considered as impurity elements when introduced into materials selected from group IV of the periodic table, the intermetallic compounds formed therefrom may be N or P-type, depending upon the degree of unbalance in the atomic proportion of the materials constituting the body, or depending upon the controlled inclusion of other suitable electrical conductivity-type determining impurities therein, such as, for example, impurity elements selected from groups II and VI of the periodic table.

Figure 2:
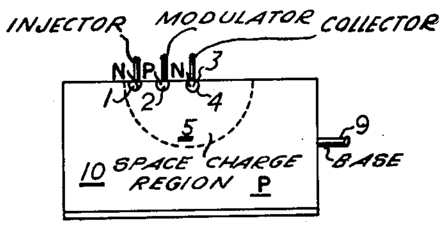
FIG. 2 is a diagrammatic side view of the device of FIG. 1 showing the position of the space charge region formed around the collector contact or electrode.
Figure 3:
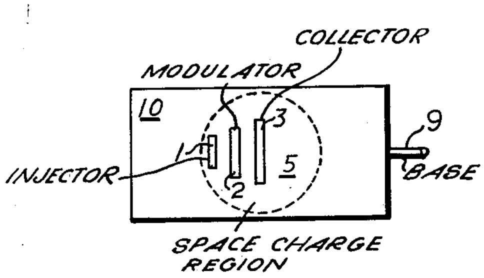
FIG. 3 is a top view of the device of FIG. 2.

As shown in FIG. 1, the contacts 1, 2 and 3 are connected by lead wires to the proper sources of biasing voltages for device operation. The electrodes shown in FIGS. 1 to 3 are designated as an emitting or injecting contact 1, a modulating contact 2, and a collector electrode 3. In accordance with the present invention, the collector electrode 3 is formed so as to have a substantially radially-disposed periphery in order to provide a substantially radially-disposed space charge region when a suitable biasing voltage is applied thereto. For the purposes of the present description, it will be assumed that the semiconductor body 10 is P-type, while the collector electrode is of N-type material, thus forming a substantially radially-disposed P-N junction 4 in the body 10. While the present invention contemplates a substantially radially-disposed collector junction 4, the electrodes or contacts 1 and 2 need not necessarily have radially formed peripheries in the body, but may have such a structure as a preferred arrangement. As has been previously described, the collector electrode 3 is preferably formed from a suitable N-type impurity. In the present embodiment, the modulator contact 2 is also preferably formed from a suitable P-type impurity, while the injecting contact 1 may be either of N-type material or may be a metal contact, as is more fully described in said prior copending application. Thus, the body 10 is provided with a plurality of contacting electrodes some of which may comprise small N and P-type regions internal to the main body of the P-type chip.

In the embodiment shown in FIGS. 1 to 3, the contacting electrodes 1, 2 and 3 may be formed, for example, by laying down lines of the correct impurity material of a desired length and width on the surface of the body 10 by electrodeposition or evaporation techniques. The body may then be heated to cause the lines to alloy into the body of the chip to form the electrodes. Alternatively, very thin wires coated with suitable alloy impurities may be placed on the surface of the body 10 and alloyed to form the line contacts shown. The N-type region of the collector contact 3 is connected to the P-type region of the main body of the chip through a source of biasing voltage, such as a battery 6, and a suitable loading resistor 30. As shown, the positive terminal of the battery 6 is connected to the N-type collector electrode, and the negative terminal of the battery 6 is connected to the P-type chip, thereby biasing the junction 4 in the so-called reverse direction and creating space charge region 5 extending substantially radially into the chip 10. The current carrier injecting contact 1 connected to the chip in the vicinity of the junction 4 is positioned so as to be included within the space charge region 5. The injection contact 1 is connected to one side of a pair of input terminals 7 through a battery 8, which biases the contact negatively with respect to the potential of the underlying space charge region. It should be understood, however, that the potential of the contact 1 is still positive with respect to the terminal 9. Under this condition, current carriers, in this case, electrons, will be injected into the space charge region 5 and will flow to the collector junction 4. As shown in the drawings, the modulating contact 2 is also positioned within the space charge region 5, and is connected to the positive terminal of a battery 11, which has its negative terminal connected to the other side of input terminals 7. Under this condition of bias, the contact 2 will be biased in reverse with respect to the potential of the underlying space charge region 5, i.e., the reverse current flow through contact 2 will be substantially nil.

Figure 7:
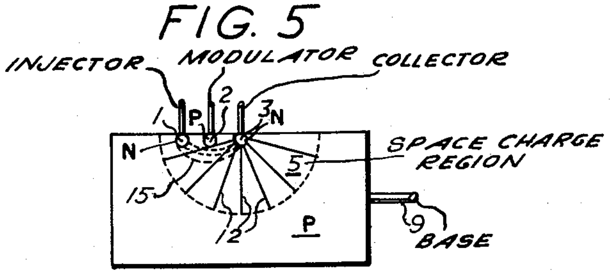
FIG. 7 is a diagrammatic side view of any of the devices of FIGS. 1 through 6 showing the substantial distribution of the radial field lines in the space charge region, and the effect thereof upon the current carriers emitted by the injecting contact.

Due to the configuration of the electrodes, the space charge region 5 extends radially into the body 10 and is substantially symmetrical with respect to the collector junction 4. Since the field of the main junction 4 is radially symmetrical, the current carriers injected by the injecting contact 1 are forced to flow near the region of influence of the modulator 2, thereby resulting in substantially higher transconductance values than can be attained by the previously-proposed planar geometrical configuration for junction 4 wherein comparable spacing of modulator and injector contacts exists. This effect is shown in FIG. 7 wherein the radial lines 12 emanating from the contact 3 represent the radial space charge field lines, and the dotted lines 15 show the direction of flow of the injected current carriers. Additionally, the capacity of the main junction 4 will be smaller for an equal width of the space charge region, as compared to the previously-proposed planar junction, thereby further contributing to the advantages of the present structure. As has also been pointed out previously, when the contact 1 comprises an impurity region, it is preferably heavily doped, as compared to the impurity content in the main portion of the body 10, which, itself, preferably contains only a relatively slight amount of P-type doping material.

Figure 4:
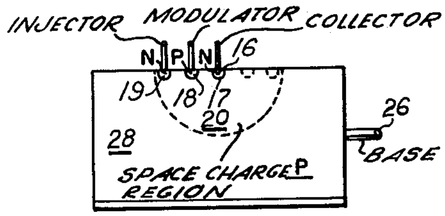
FIGS. 4 and 5 are, respectively, a side view and a top view of a second embodiment of the present invention showing a slightly different electrode arrangement and the position of the space charge region in relation to these electrodes.
Figures 5, 6:
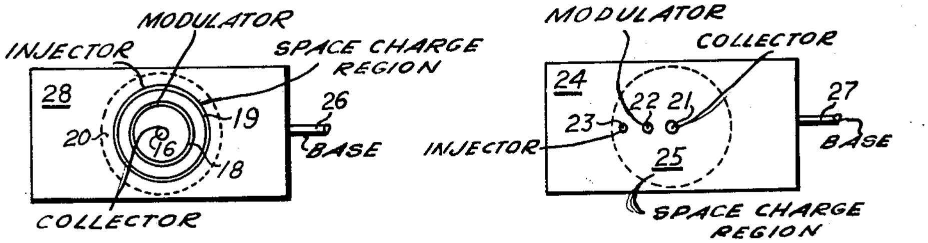
FIG. 6 is a top view of a still further embodiment of the present invention.

As an alternative configuration for the various electrodes, a configuration such as shown in FIGS. 4 and 5 may be utilized. In this embodiment, the collector 16 comprises a small, essentially hemispherical or point electrode, which will have a substantially cylindrical cross-section similar to that shown in FIG. 2. As described with respect to FIGS. 1 through 3, the collector region 16 in FIG. 4 may also comprise an alloyed N-type region in the semiconductive body 28, which will provide a substantially radial P-N junction 17. The modulating contact 18, and the injecting contact 19 comprise suitable P-type and N-type alloyed rings encircling the collector contact 16, or the modulating contact 18 may be an alloyed ring while the injecting contact 19 is a metallic contact. A base contact 26 makes ohmic contact with body 28. With the application of suitable biasing voltages, such as has been described, a substantially radial space charge region 20 will exist which results in the same type of field distribution together with the concomitant advantages set forth with respect to the first embodiment.

As a still further alternative embodiment, reference is made to FIG. 6 wherein not only the collector contact 21 is shown as a substantially hemispherical point contact, but the modulating contact 22 and the injecting contact 23 also comprise substantially hemispherical point contacts, which may be of the same, or of diminishing diameter in relation to the collector contact 21. A base contact 27 makes ohmic contact with body 24. As with the previous embodiments, the application of suitable biasing voltages to the various electrode regions in the semiconductive body 24 will provide a substantially radial symmetrically-disposed space charge region 25.

Although the injecting contacts and modulating contacts in the spacistor described have been shown as either a metallic pressure contact or as a heavily doped N-type region for the injecting contact, and as a heavily doped P-type region for the modulating contact, it should be understood that a P-type region could be used as an injecting contact, and an N-type region could be used as a modulating contact when the collector region is a P-type region and the main body of semiconductive material is N-type, and with an appropriate reversal of biasing voltages. It should also be understood that the dimensions of the various electrode regions are very small, although they have been greatly exaggerated in the drawing for the purpose of clarity. For instance, the present invention contemplates a radius on the order of $5\times10^{-4}$ cm. for collector region 3, together with decreasing values of radii for region 3 down to the situation where region 3 would essentially be considered as a point. Similarly, the radius of the space charge region 5 would have an exemplary value of $10^{-2}$ cm. along with corresponding smaller values.

Although there have been described what are considered to be preferred embodiments of the present invention, various adaptations and modifications thereof may be made without departing from the spirit and scope of the invention as defined in the appended claims.

What is claimed is:

1. In combination, an electrical translation device comprising a body of semiconductive material including a radially-disposed collector region, a modulating contact circumscribing said collector region, an injecting contact circumscribing said modulating contact, and means for biasing said collector region to establish a space-charge region in said body which includes said injecting electrode and said modulating electrode within its confines.

2. In combination, an electrical translation device comprising a body of semiconductive material including a plurality of electrodes all of which comprise line contacts, and biasing means connected between one of said electrodes and said body for establishing a space-charge region in said body which includes all of said electrodes within its confines.

3. In combination, an electrical translation device comprising a body of semiconductive material having a radially-disposed internal collector region, a controlling electrode in contact with said body, an injecting electrode in contact with said body, and means connected between said collector region and said body for establishing a space charge region in said body, said controlling and injecting electrodes being included within said space charge region.

4. In combination, a body of semiconductive material having at least one radially-disposed P-N junction therein, a controlling electrode in contact with said body, an injecting electrode in contact with said body, and means for biasing said P-N junction to establish a space charge region in said body which includes said controlling electrode and said injecting electrode within its confines.

5. In combination, an electrical translation device comprising a body of single conductivity type semiconductive material having an internal radially-disposed collector region, a controlling electrode in contact with said body, an injecting electrode in contact with said body, and a source of biasing voltage connected to said collector region adapted to establish a space charge region in said body which includes said injecting electrode and said controlling electrode within its confines.

6. In combination, an electrical translation device comprising a body of P-type semiconductive material having an internal radially-disposed N-type collector region, a controlling electrode in contact with said body, an injecting electrode in contact with said body, and means for biasing said collector region to establish a space charge region in said body which includes said injecting electrode and said controlling electrode within its confines.

7. In combination, an electrical translation device comprising a body of semiconductive material having a radially-disposed N-type collector region, a P-type region circumscribing said collector region, an N-type region circumscribing both said collector region and said P-type region, and biasing means connected between said collector region and said body for establishing a space-charge region in said body which includes all of said N and P-type regions within its confines.

8. An electrical translation device comprising a body of semiconductive material having at least one radially-disposed P-N junction therein, a plurality of other contacts to said body, said contacts being positioned so as to be included within a space charge region established in the vicinity of said P-N junction.

9. An electrical translation device comprising a body of semiconductive material including a radially-disposed internal collector electrode, a modulating electrode in contact with said body, an injecting electrode in contact with said body, said modulating and injecting electrodes being positioned so as to be included within a space charge region established in the vicinity of said collector electrode.

10. In combination, an electrical translation device comprising a body of semiconductive material having an internal radially-disposed N-type collector region, a P-type controller region adjacent said collector region and an N-type injecting electrode adjacent said controller region and means for biasing said collector region to establish a space charge region in said body which includes said controller region and said injecting electrode within its confines.

References Cited in the file of this patent

UNITED STATES PATENTS

| | | |
|---|---|---|
| 2,476,323 | Rack | July 19, 1949 |
| 2,702,838 | Haynes | Feb. 22, 1955 |
| 2,801,347 | Dodge | July 30, 1957 |
| 2,801,348 | Pankove | July 30, 1957 |
| 2,862,115 | Ross | Nov. 25, 1958 |
| 2,877,358 | Ross | Mar. 10, 1958 |
| 2,896,151 | Zelinka | July 21, 1959 |
| 2,932,748 | Johnson | Apr. 12, 1960 |
| 2,958,022 | Pell | Oct. 25, 1960 |